Oct. 7, 1952 W. R. PETERSON ET AL 2,613,022
APPARATUS FOR SEALING VALVED BAGS
Filed March 20, 1947 11 Sheets-Sheet 1

INVENTORS.
WILLIAM R. PETERSON.
CARL H. HARTMAN.
BY
Ward, Crosby, & Neal
Their ATTORNEYS.

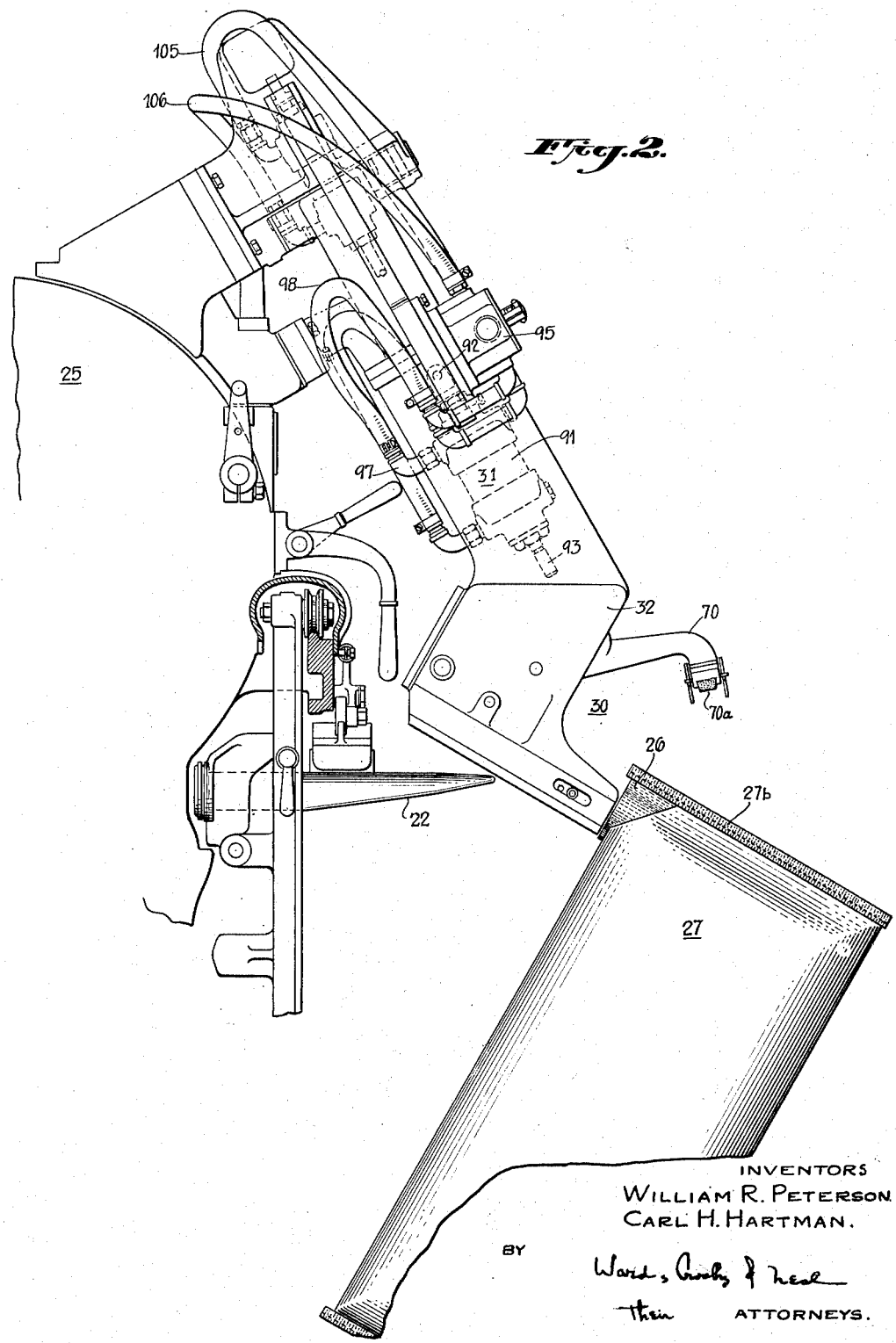

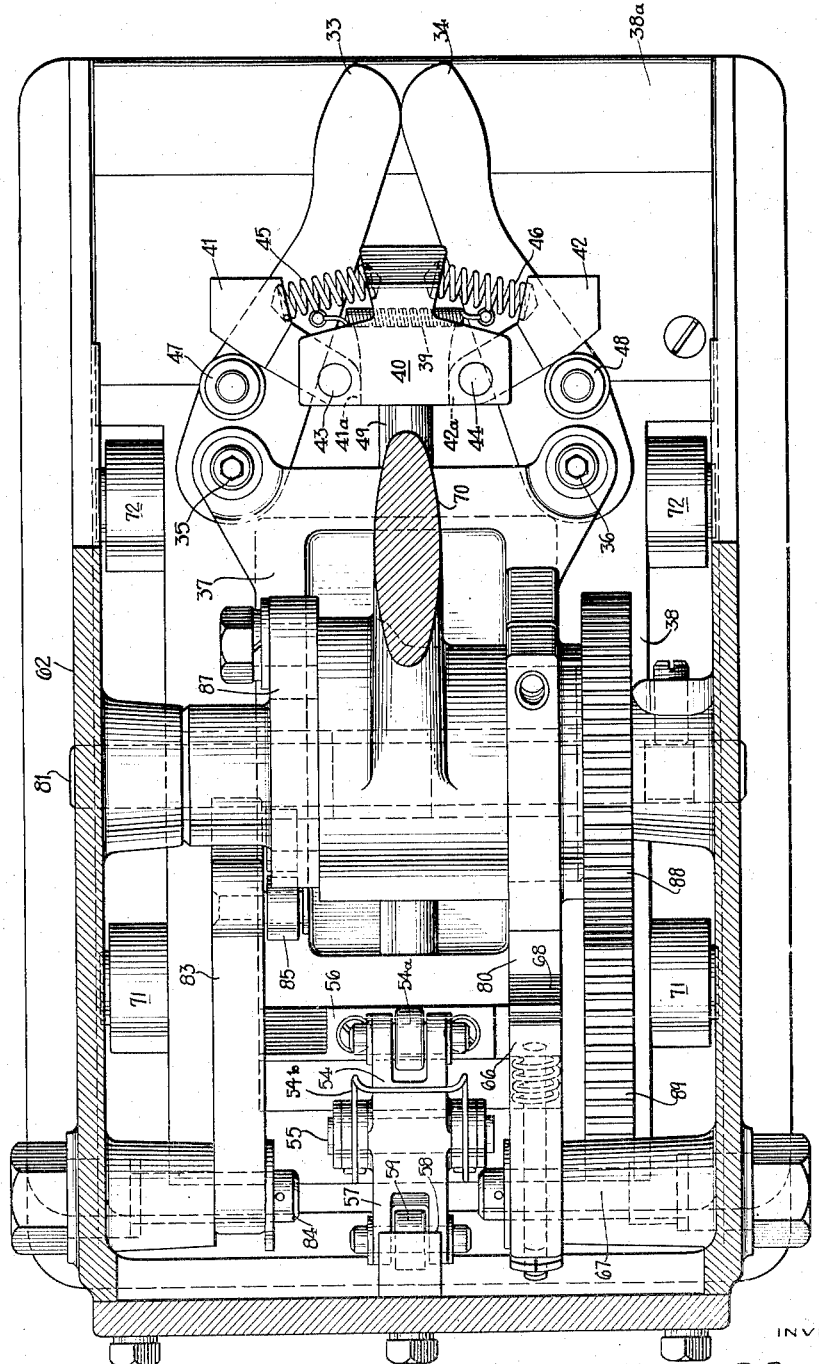

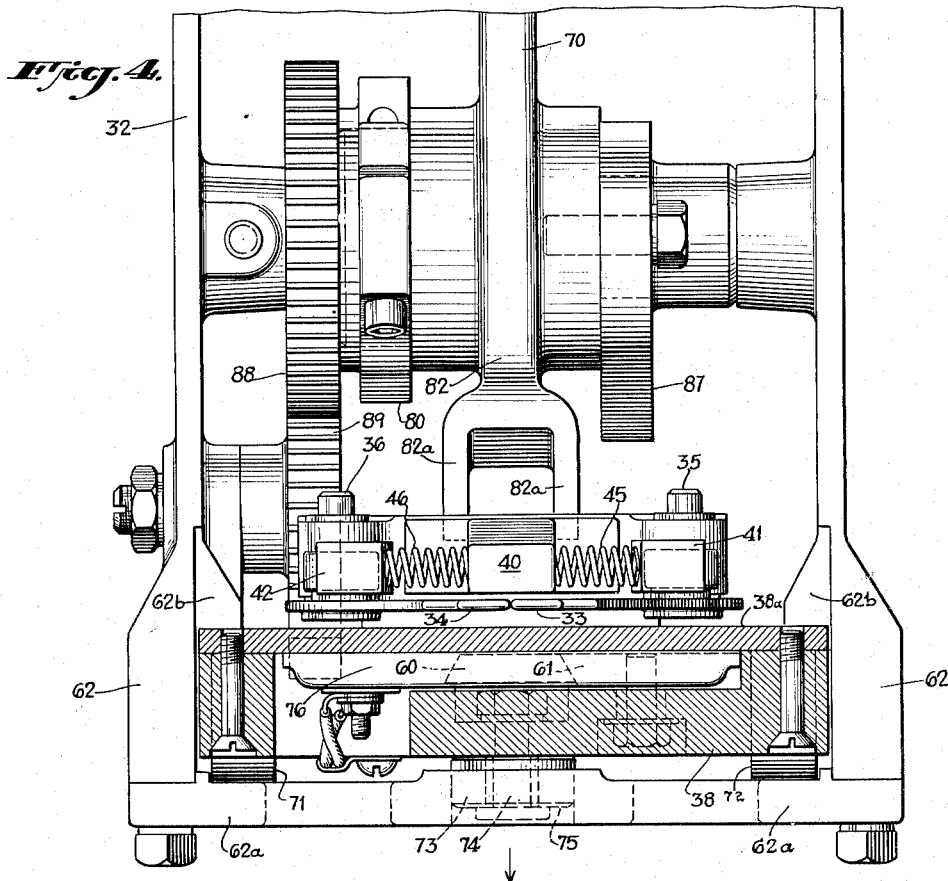

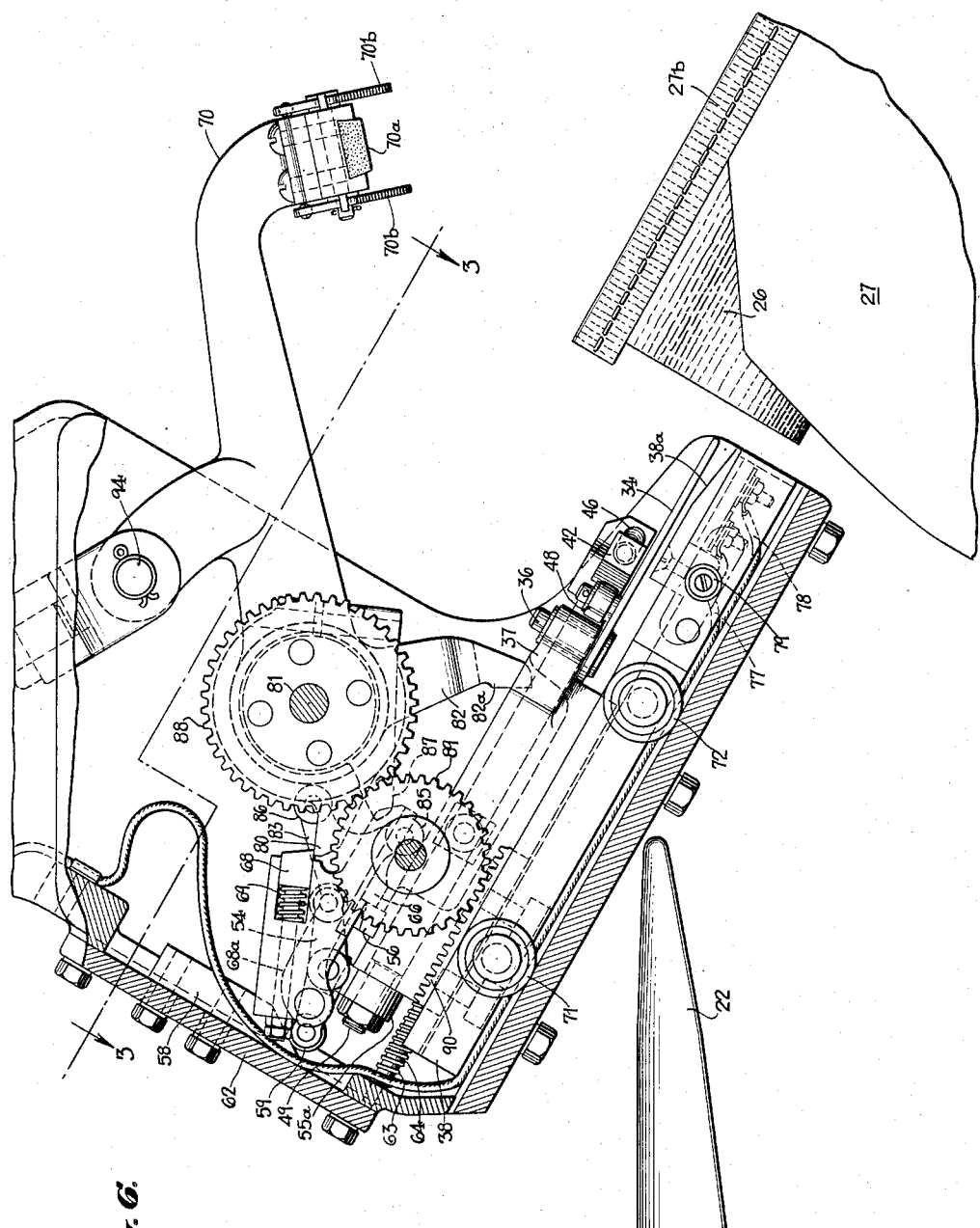

Oct. 7, 1952     W. R. PETERSON ET AL     2,613,022
APPARATUS FOR SEALING VALVED BAGS
Filed March 20, 1947     11 Sheets-Sheet 6
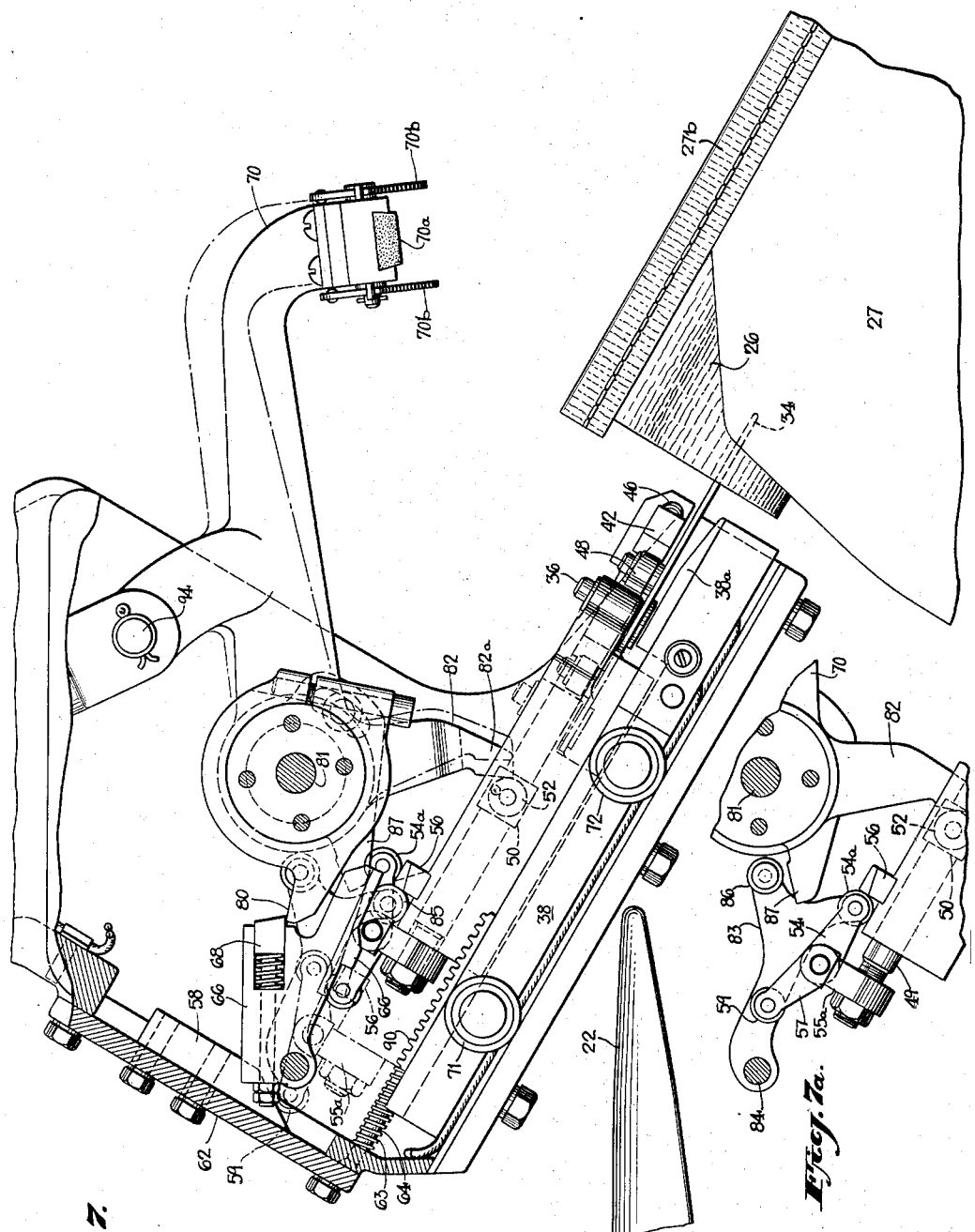
INVENTORS.
WILLIAM R. PETERSON.
CARL H. HARTMAN.
BY Ward, Crosby & Neal
their ATTORNEYS.

INVENTORS
WILLIAM R. PETERSON.
CARL H. HARTMAN.
BY Ward, Crosby & Neal
their ATTORNEYS.

Oct. 7, 1952 W. R. PETERSON ET AL 2,613,022
APPARATUS FOR SEALING VALVED BAGS
Filed March 20, 1947 11 Sheets-Sheet 8
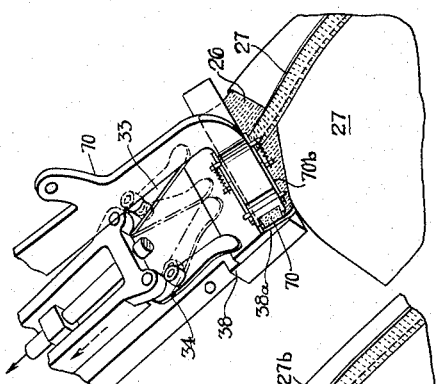
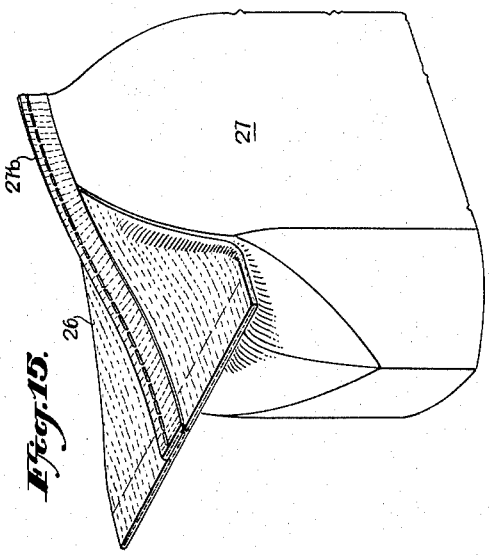
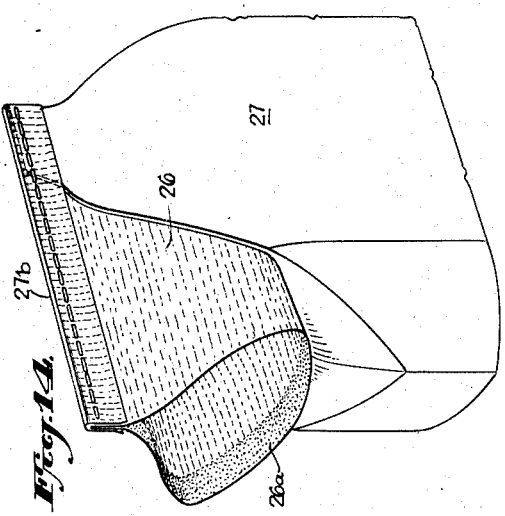
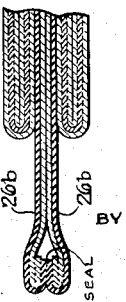
INVENTORS.
WILLIAM R. PETERSON.
CARL H. HARTMAN.
BY Ward, Crosby & Neal
their ATTORNEYS.

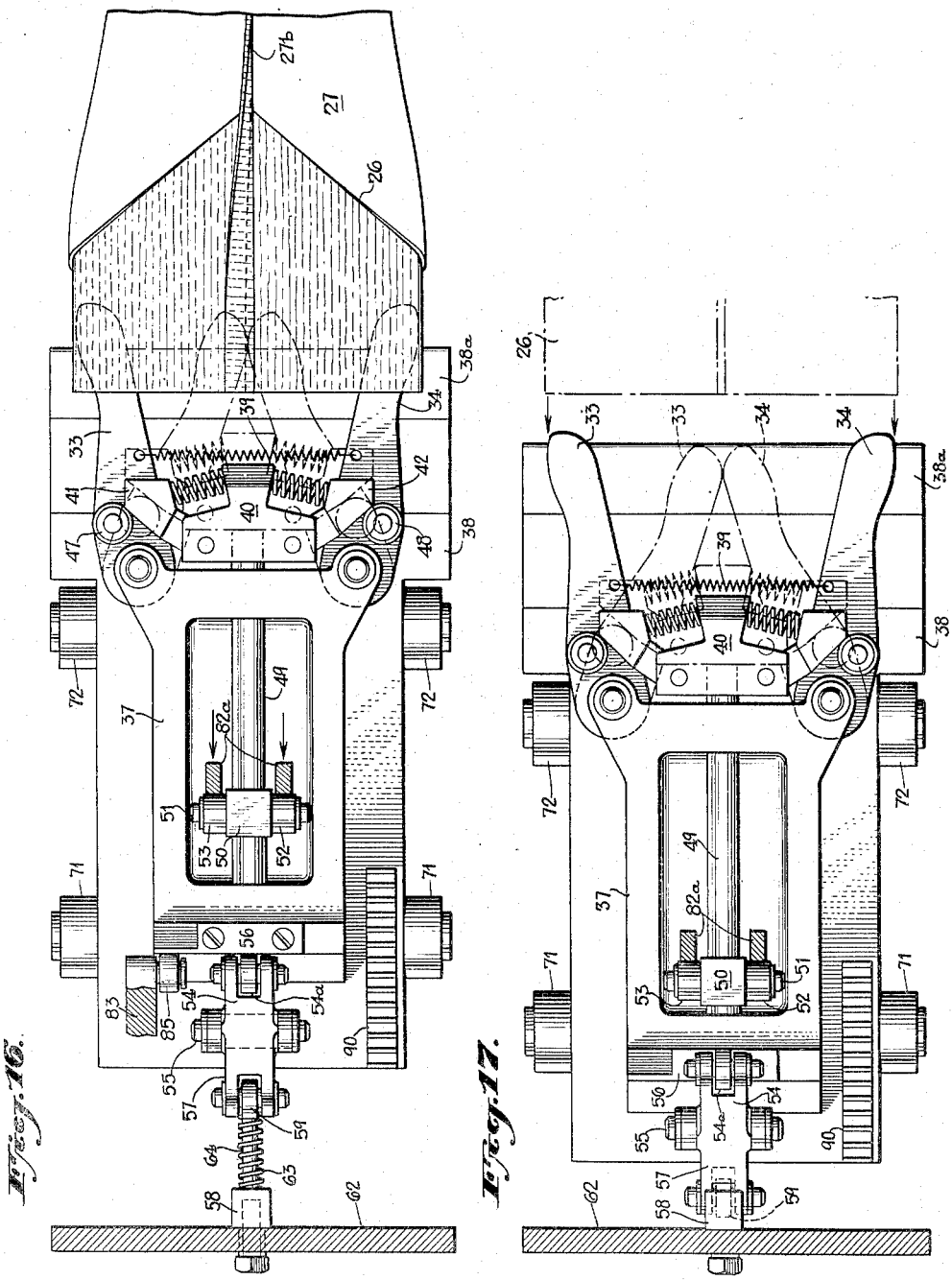

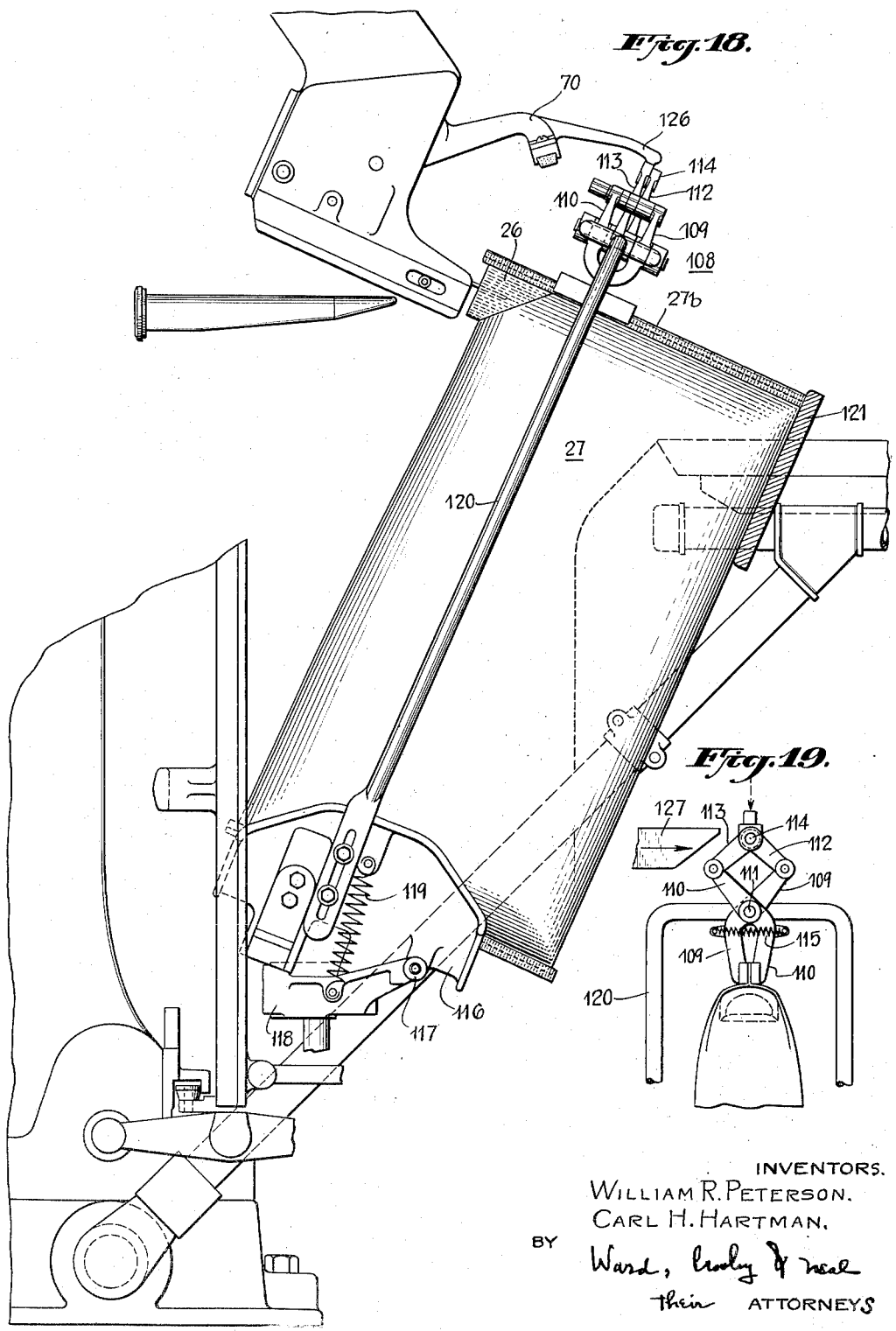

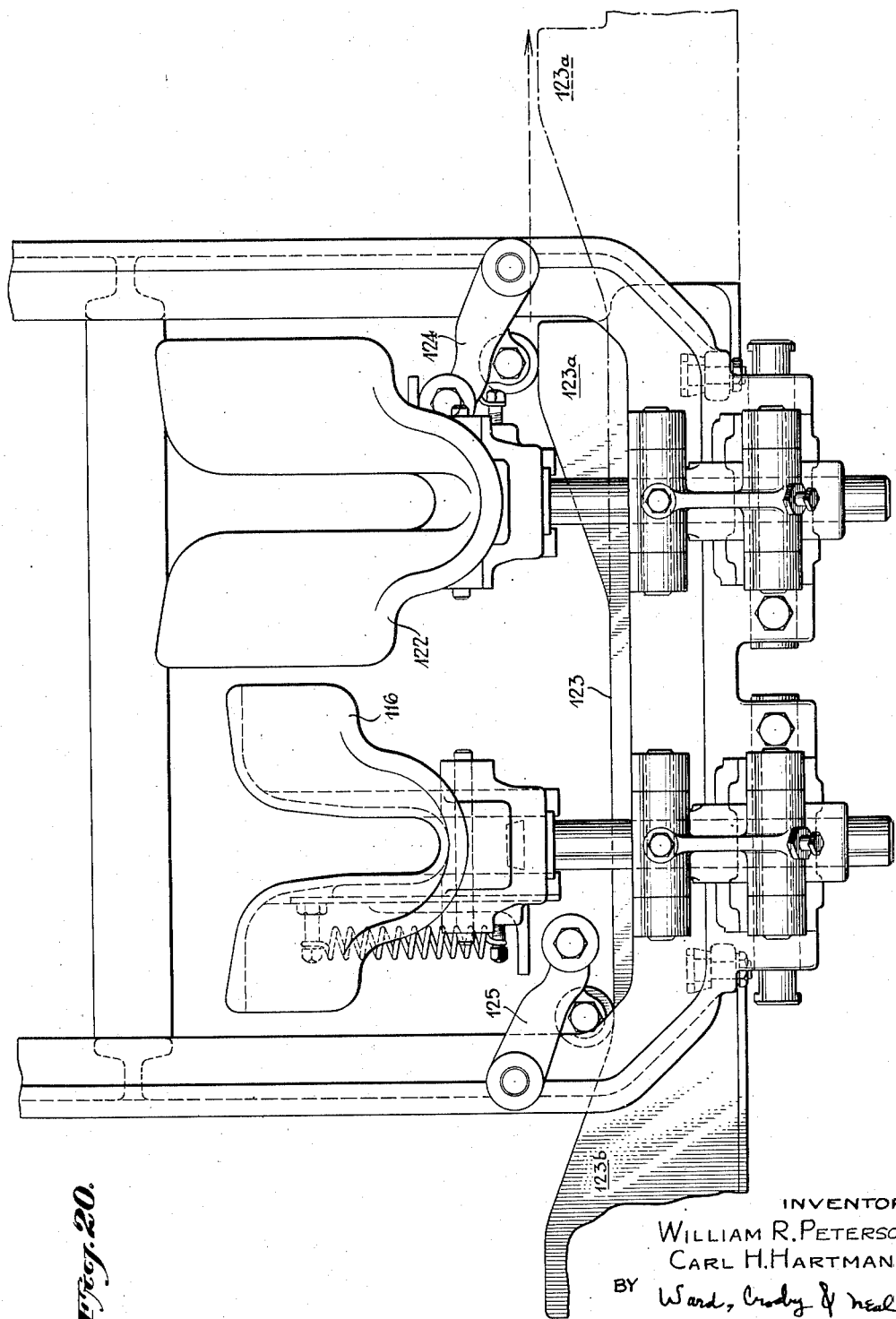

Patented Oct. 7, 1952

2,613,022

UNITED STATES PATENT OFFICE 2,613,022

APPARATUS FOR SEALING VALVED BAGS

William R. Peterson, Oswego, and Carl H. Hartman, New Rochelle, N. Y., assignors to St. Regis Paper Company, New York, N. Y., a corporation of New York Application March 20, 1947, Serial No. 735,866

19 Claims. (Cl. 226—48)

This invention relates to apparatus for sealing containers, and more particularly to apparatus for sealing a valve for a valved bag.

Containers in the form of paper bags and the like have been heretofore proposed having a sleeved valve into which a filling spout may be inserted. Such valve may be located adjacent one corner of the container, and adapted for being at least partly collapsed by the action of the material which fills the container, thereby effecting a substantial closure of the container. This closure may be more or less automatic in its effect, for example, in bags which are composed of one or more layers or plies of flexible paper the sleeve valves which are normally employed are easily collapsible, and as they are flattened in response to the filling of the bag, the above mentioned closure tends to occur.

After a bag of the above type has been filled by means of a spout and has been disengaged therefrom, it is normal practice for the operator manually to tuck in the valve sleeve which extends exteriorly of the bag. Thus a supplemental closing action is effected for the bag valve.

However, in spite of the semi-automatic partial closing action of the valve, and in spite of the tucking in of said sleeve, it has been found that there may be a leakage of certain types of material from containers of this character. Also there may be pilferage and passage of moisture through such valves.

Furthermore, in the case of a bag valve which is closed as above described, ingress and egress of insects may occur. This is especially objectionable with respect to foodstuffs, for example, flour.

Bags having valves of the above type which are not provided with a positive seal, also, may suffer the disadvantage of puffs of dust-laden air from the bag when the latter is dropped or suddenly subjected to external pressure.

According to the present invention, novel apparatus is provided for sealing the valve of a bag and thus eliminating the above noted difficulties.

Various further and more specific features and advantages of the invention will clearly appear from the detailed description given below taken in connection with the accompanying drawings which form a part of this specification and illustrate, by way of example, preferred arrangements of apparatus for carrying out the invention. The invention consists in such novel apparatus and combinations of features as may be shown and described in connection with the structures herein disclosed.

In the drawings:

Fig. 2 is a side elevation of one of such devices in operative association with a bag and with a bag filling machine;

Fig. 3 is a plan view, partly in section, of one form of valve spreader device;

Fig. 4 is an end view, partly in section and with parts broken away, of the means shown in Fig. 3;

Fig. 5 is a front elevation of a bag valve clamp shown in cooperation with fingers which spread the bag valve and also with a tape folding or flattening member;

Fig. 6 is a side view, partly in section and with parts broken away, of a heat sealing unit embodying one form of the present invention shown in conjunction with a bag and a filling spout of a bag filling machine;

Fig. 7 is a view of the parts shown in Fig. 6 in a different operating position;

Fig. 7a is a view of a certain latch and trip lever therefor shown in Fig. 7;

Fig. 9 is a perspective view with certain parts omitted and other parts broken away, of a heat sealing unit showing the early stages of the operation thereof;

Fig. 10 is a perspective view of parts shown in Fig. 9 in a more advanced operating position showing the spreading of a bag valve by a valve spreader;

Fig. 11 also is a perspective view of the parts shown in Fig. 10 in a still more advanced operating position illustrating the relative positions of the jaws of the clamp immediately prior to the pressing or clamping of the bag valve;

Fig. 12 is a perspective view of the parts shown in Fig. 11 illustrating the clamping of the bag valve and the withdrawal of the spreader fingers;

Fig. 13 is a cross-sectional view of a form of bag valve having a sleeve with lips thereon bent inwardly and sealed, by the use of the invention.

Fig. 14 is a perspective view of a valve corner portion of another form of bag having a valve sleeve therein, the valve being in a semi-closed position which normally results from filling of the bag;

Fig. 15 is similar to Fig. 14 with the exception that the valve sleeve of the bag is shown in a sealed condition;

Fig. 16 is a plan view, partly in section and with parts broken away, of one jaw of the bag valve clamp and of a valve spreader carriage and spreader assembly in one operating position thereof;

Fig. 17 is a view of the parts shown in Fig. 16 in a different operating position.

Fig. 18 is a side elevation of means for tilting a valve bag away from a filling apparatus to position the valve of the bag for sealing;

Fig. 19 is a front elevation of that portion of the bag tilting means, shown in Fig. 18, for grasping the top part of a bag; and Fig. 20 is a front elevation of a pair of bag saddles or chairs and tilting means therefor which may be employed with the mechanism shown in Fig. 18, the position of the chair shown in Fig. 18 being tilted and the corresponding chair untilted in Fig. 20.

Figure 1:
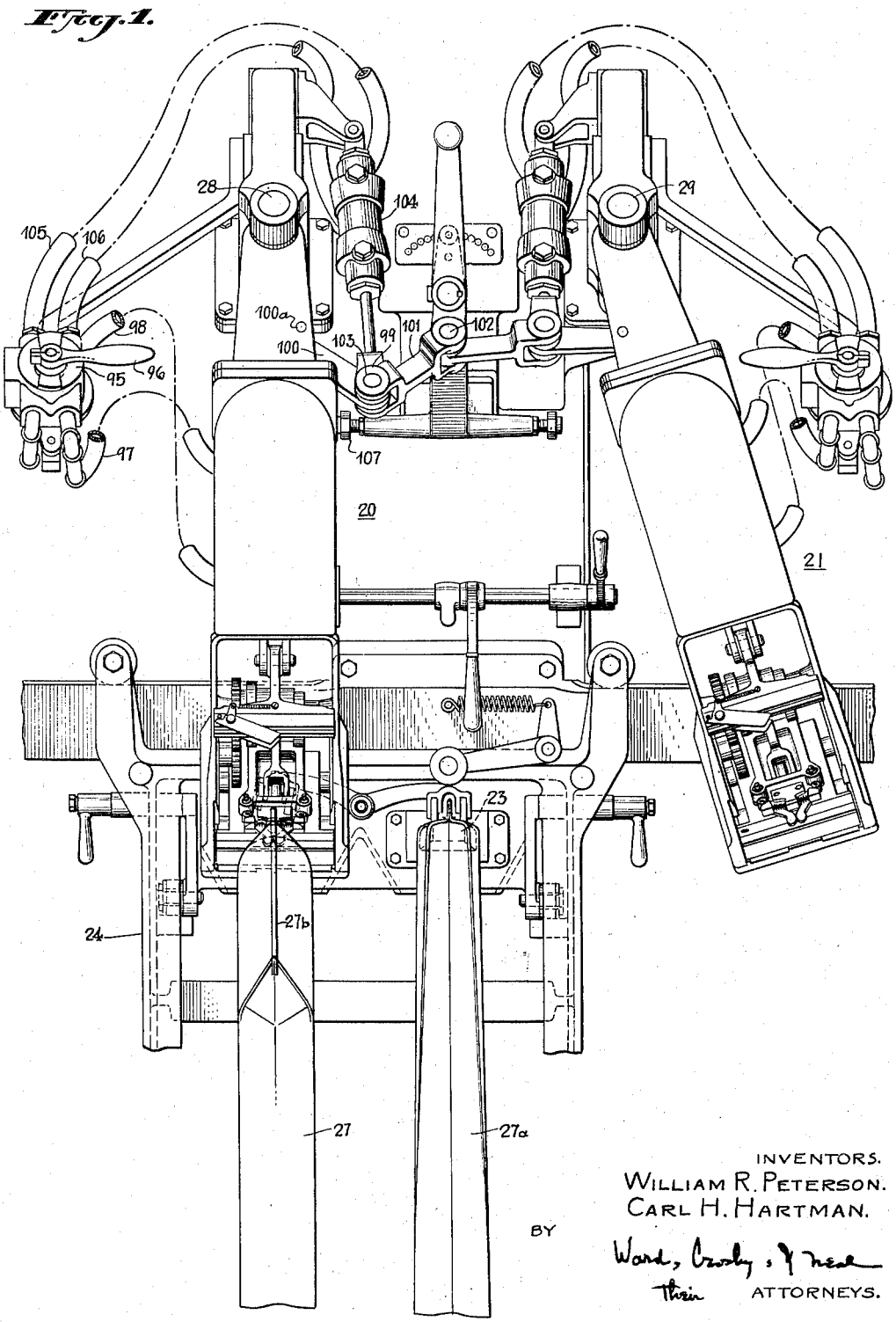
Figure 1 is a front elevation of one embodiment of the invention illustrating a pair of bag sealing devices in operative association with a bag filling apparatus.

Referring to the drawings in further detail, a pair of heat sealing units 20 and 21 is shown in Fig. 1. These units are duplicates of one another and are shown in operative relationship with a bag filling machine having two separate filling spouts. The filling spouts are shown as at 22 (Fig. 2) and 23 (Fig. 1) and are mounted upon a shifting bag frame 24 to be described hereinafter. The bag filling machine is indicated at 25 (Fig. 2) and may be of a well known variety. The spouts 22 and 23 are each adapted for entering a valve of a conventional type of valve bag. As shown in Fig. 2, the spout 22 is adapted for entering a valve sleeve 26 of a bag 27.

It is, of course, possible to employ a single heat sealing unit with a filling machine. However, in the form shown, two such units are employed which are adapted to be shifted from an inactive to an active position relative to the valve which they are to seal. The shifting of the heat sealing unit in the form shown constitutes an angular movement, the units 20 and 21 respectively being pivoted at 28 and 29. As shown in Fig. 1 the unit 21 has been shifted angularly to the inactive position thereof wherein it will not interfere with the filling of a bag 27a. The unit 20 is in an operative or active position and is prepared for spreading and sealing the valve 26 of bag 27. The left hand unit 20 only will be described in detail below.

The heat sealing units may be manually shifted from their respective active and inactive positions. However, suitable power means are employed, in the form shown, for so shifting said units. Said power means and the linkage associated therewith will be described hereinafter.

In the embodiment of the invention illustrated, the novel heat sealing unit comprises, in general, suitable means for spreading the wall surfaces of a protruding valve sleeve of a bag into generally flattened parallel sealable positions (see Fig. 10). After the valve sleeve has been spread, a novel clamp is applied thereto whereby the inner surfaces thereof are urged together, during and after the disengagement of the spreader. In order to actuate heat sensitive adhesive which may be upon the inner edge surfaces of the valve sleeve, heat may be applied to the sleeve during the clamping action, for example, by heating a portion of the clamp. Power means may be provided for actuating said clamp and thereby applying a high pressure to the sleeve. Thus combined heat and pressure are employed to seal the valve. However, heat may be omitted in one form of the invention, and a pressure sensitive or pressure actuatable adhesive may be used.

In the embodiment shown, with particular reference to Figs. 2, 4–8, the novel heat sealing unit 20 is constituted by a valve sleeve spreading and clamping means 30 which is in operative association with suitable power means 31 (Fig. 2) for actuating said clamping means in a manner to appear hereinafter.

To the inner surfaces of the valve sleeve 26 (Figs. 1 and 2), for example, adjacent the margin of the lip of the sleeve at 26a, a suitable adhesive may be applied such as a heat sensitive or heat actuatable adhesive. Such an adhesive may be either of the thermo-setting or thermo-plastic variety of suitable well known types. Instead of applying the adhesive to the inner surface of the bag valve as shown in Fig. 14, said adhesive may be applied to the outer surface thereof as a coating or lamination as shown at 26b in Fig. 13, and the end edges may be folded inwardly, ready to be sealed by the apparatus herein described.

The bag 27 normally is positioned in such a manner that the valve sleeve 26 thereof engages, for example, spout 22 during the filling operation. Immediately after the filling of the bag, and/or after any delay which may be interposed to allow dissipation of surplus air pressure therein, the bag valve is disengaged from the spout and is moved to the position indicated in Fig. 2. Such movement may be accomplished by means to be described hereinafter in connection with Figs. 18–20.

Prior to the filling of the bag, and when it is substantially empty, the sleeve thereof may be almost flat and in the plane of the empty bag. When the sleeve of the empty bag is applied upon the filling tube it, of course, conforms to the shape of the tube. As the bag becomes filled, the valve will tend to assume the shape shown in Fig. 14 in response to the stretching out of the bags by the contents thereof. As the bag is filled, the material therein forces the bag surfaces outwardly and the gusset upwardly at the region beneath the sleeve and thus tends to flatten the valve and its sleeve horizontally. Thus the valve portion of the filled bag will appear substantially as shown in Fig. 14 as it is withdrawn from the filling tube. The major axis of the cross section of the valve in Fig. 14 is substantially horizontal.

Although the filling of the bag may flatten and spread the valve to a certain degree, it has been found desirable prior to clamping and sealing same, to accomplish a positive and further spreading and flattening of the protruding sleeve, preferably in a horizontal plane substantially in coincidence with that of the major axis of the sleeve shown in Fig. 14. The valve may be sealed in a horizontal plane as viewed in Fig. 15 in a manner to appear hereinafter.

After the bag 27 has been filled and moved to the position shown in Fig. 2 and the valve sleeve thereof has been somewhat flattened by the filling operation, the heat sealing unit is angularly shifted from the inactive to the active position thereof, and the spreading and clamping means are thus moved into position for acting upon the valve sleeve. Suitable means (not shown) may be provided for angularly adjusting the position of the spreading and clamping means 30 relative to a mounting 32 (Fig. 2) therefor whereby a proper axial relationship between said valve sleeve and the spreading-clamping means is accomplished.

In the form shown in the drawings (Figs. 3–8), the novel spreading means for the sleeve are constituted by a pair of spreader fingers 33, 34, which, in an inactive position, are contracted and disengaged from the sleeve, and which are adapted for being inserted in a contracted condition from which they are spread or expanded relative to one another, thus spreading and flattening the sleeve.

As shown in Fig. 3, the spreader fingers 33 and 34 are respectively pivotally mounted at 35 and 36 upon a spreader finger carriage 37, hereinafter referred to as a carriage. The latter is adapted for axial movement relative to the housing 32 which, in the form shown serves as a housing, not only for the carriage 37 and the spreader fingers but also for one arm or jaw of the above mentioned valve clamp, i. e., an arm designated as an anvil 38.

As above mentioned, the spreader fingers 33 and 34 are adapted for insertion while they are in a contracted condition and are spread or extended relative to one another, for example, in response to closing movement of the clamp. It is, of course, desirable for the spreader fingers to extend beyond one edge of the spreader carriage 37 in order that the latter may not interfere and collide with the bag portions. Suitable means are provided for spreading the fingers 33 and 34 which means operate somewhat in the manner of a resilient wedge which is urged between the fingers to thrust same outwardly. As shown in Fig. 3, the fingers 33 and 34 are urged toward one another, that is, toward a contracted position by means of a tension spring 39. The above mentioned resilient wedge member also may be referred to as an expander assembly. In the form shown in Fig. 3, this assembly is constituted by a central expander block 40 having pivotally mounted thereupon a pair of expander arms 41 and 42. These arms are respectively pivotally mounted at 43 and 44 and are thrust outwardly relative to the block 40 by means of expander springs 45 and 46 respectively whereby limit stop portions 41a and 42a are urged against block 40. Thus the arms 41 and 42 of the expander assembly in effect constitute resiliently mounted sides of said wedge member.

And said expander arms are so angularly disposed upon the block 40 that they are in the shape of a somewhat flattened wedge with the point thereof pointing toward the line which connects the two finger pivots 35 and 36. There are mounted respectively upon the fingers 33 and 34 suitable rollers 47 and 48 which are adapted for rotation about suitable studs, and which are situated for cooperative engagement with the expander arms 41 and 42 respectively. A thrust to the left of the expander assembly will produce a spreading or expanding force upon the fingers 33 and 34.

The expander block 40 is mounted upon a rod 49 which hereinafter may be termed an expander rod. The latter is mounted for axial movement upon the spreader carriage 37 and extends through suitable centrally located bores in said carriage as shown in Figs. 3, 16 and 17.

The above described spreader fingers are able to spread valve sleeves of various sizes, for example, and they can accommodate variations in valve sizes in the same type of bag valve. When the fingers 33 and 34 are spread as the result of axial movement of rod 49 as above described, the fingers, by virtue of the springs 45 and 46, may adapt themselves to various sizes of valve sleeves.

A thrust is communicable to the rod 49, in a manner to appear more fully later, by means of a bifurcated member which engages a pair of rollers mounted on said rod. As shown in Figs. 16 and 17, there is attached to the expander rod 49 a block 50 to which is attached a pin 51 upon which in turn are mounted a pair of rollers 52, 53 on either side of the block.

When the expander assembly or resilient wedge member has been urged to the left as viewed in Fig. 16, thereby expanding the fingers 33 and 34, it is desirable to lock the expander rod 49, whereby the fingers cannot contract. A suitable device for so locking said expander rod, and thereby locking the fingers 33 and 34 in the expanded position, is provided comprising an expander rod latch 54 (Figs. 3, 6–8, 16, 17). The latter is pivotally mounted upon a pin 55 which, in turn, as shown in Fig. 6, is mounted upon a suitable fulcrum member 55a. The fulcrum member 55a is rigidly attached to the rod 49. A suitable roller 54a may be mounted at the extremity of the latch 54 in order to facilitate the cooperation thereof with a latch plate 56. When the rod 49 is urged to the position shown in Fig. 16, the latch 54 will fall adjacent the latch plate 56 mounted upon the carriage 37, and thereby will prevent the rod from returning to its initial position. As shown in Fig. 6, the expander rod latch 54 is in the up or inactive position relative to the latch plate 56. A spring 54b mounted, for example, on fulcrum member 55a can be employed for urging latch 54 downwardly as viewed in Fig. 3.

Figure 8:
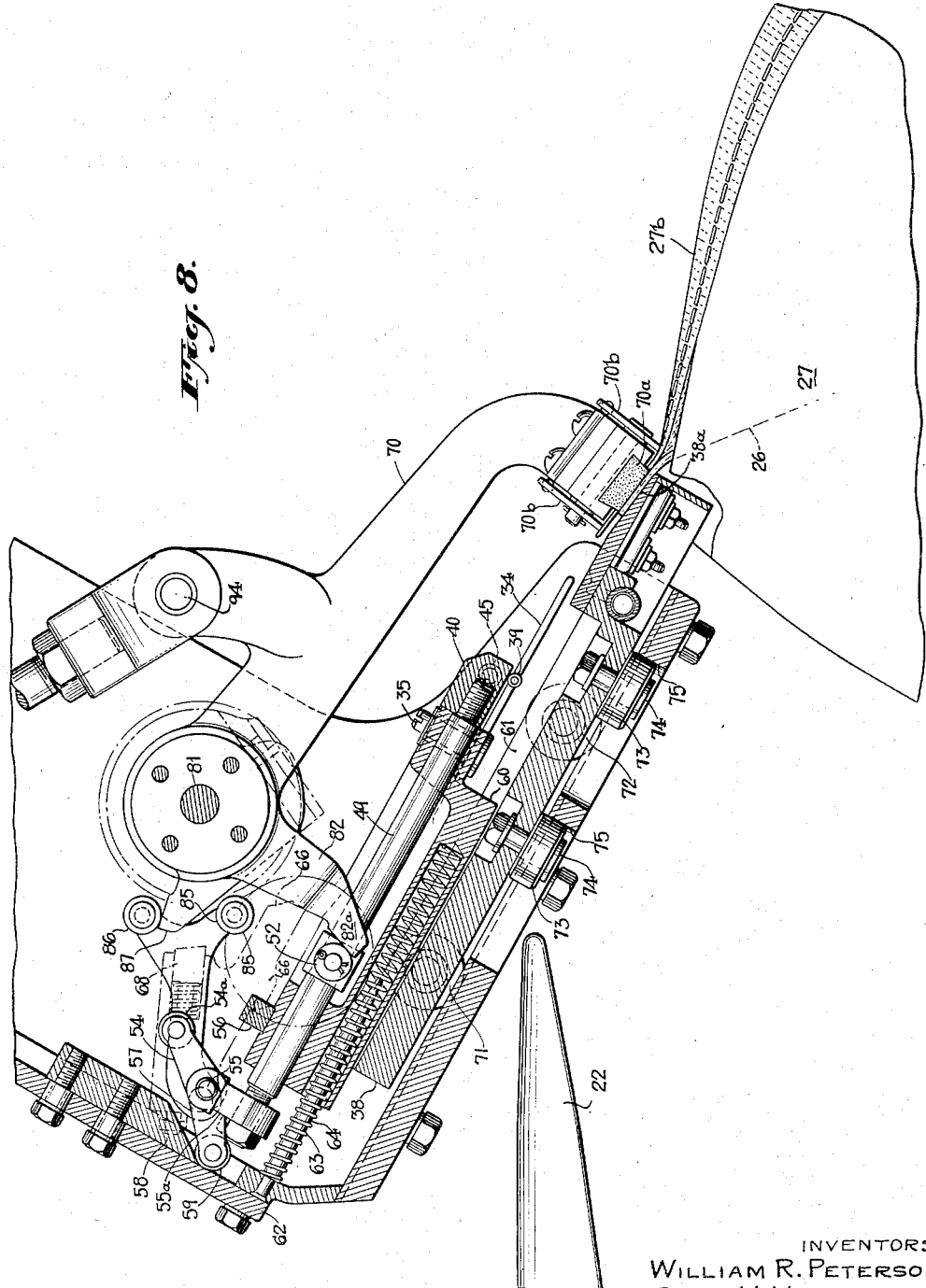
Fig. 8 is a view of the device shown in Figs. 6 and 7 in still a different operating position and with certain of the parts omitted for the purposes of clarity.

The latch 54 has attached thereto an arm 57 which is adapted for contacting an expanding rod latch trip block 58 (Figs. 6 and 8). The arm 57 may have mounted thereupon a suitable roller 59 which may facilitate the engagement with the block 58. As will appear hereinafter, when the latch 54 has locked the fingers in their expanded condition, the fingers can be released and thus contracted in response to the roller 59 striking the block 58, thereby releasing the latch 54.

The spreader carriage 37 is slidably mounted relative to the anvil 38 and, in the form shown the two are adjacent and in sliding contact with one another. The carriage 37 is provided with a key 60 (Fig. 4) which fits and slides in the anvil 38. A plate 61 rigidly attached to the anvil cooperates with the key 60 and holds the key and the anvil in free straight line sliding position.

Thus the rod 49 is movable axially relative to the carriage 37 and the latter is movable axially relative to the anvil 38. As will appear later, the anvil 38 also is movable axially relative to a supporting frame member 62 which constitutes a part of the above mentioned housing 32. With reference to the axial movement of the rod 49, it may assume two extreme positions. As shown in Fig. 3, the rod is in the right hand extended position wherein the fingers are contracted. As shown in Fig. 16, the rod 49 is in the left hand extended position relative to the carriage 37 in which the spreader fingers 33, 34 are expanded. In the right hand extended position of the rod, the member 55a (expander rod latch fulcrum member) is in contact with the carriage 37 as shown in Fig. 6. In this position, the expander arms 41 and 42 preferably are in contact with the rollers 47 and 48 upon the fingers 33, 34 but do not exert an appreciable expanding force thereupon. Thus the rod 49 may not slide back and forth axially in so-called "lost motion."

The finger carriage 37 normally is locked in an inactive position by means of a latch mechanism. Suitable resilient means such as a coil spring 64 mounted upon a holding rod 64 urges the carriage 37 to the right as viewed in Fig. 6 toward the active position of the carriage. The holder rod 64 preferably is mounted upon the frame 62 at the left thereof (Fig. 6) and it extends into a suitable recess in the carriage which also receives the spring 63. If desired, a plurality of rods 64 and spring 63 may be employed.

The above mentioned latch is indicated at 66 (Figs. 3 and 6) and constitutes a latch form which is pivotally mounted, for example, upon a suitable stud 67 (Fig. 3). The latch 66 is adapted for cooperating with the latch plate 56, as shown in Fig. 6, and for retaining the carriage in a withdrawn or inactive position.

The latch 66 is provided with a member for facilitating the tripping thereof comprising a resiliently mounted catch 68 (Fig. 6) which preferably is mounted adjacent the top surface of the latch 66 and which constitutes, for example, an axially shiftable member having a shaft 68a (Fig. 6) which is shiftable within the body portion of the latch 66. Suitable means such as bolts attached to the extremity of the shaft 68a restrict the axial movement thereof in one direction and the head of the catch 68 restricts the axial motion in the opposite direction. A suitable coil spring 69 may be mounted beneath the head 68 surrounding the shaft 68a whereby the head of the catch is urged outwardly. The necessity for resiliently mounting the catch is to permit a return movement of a trip lever which is adapted for tripping the latch 66 in a manner which will appear hereinafter.

The above mentioned clamp is constituted by two cooperating arms or jaws which are herein designated as the anvil (already described) and a pressing arm or press 70 (Figs. 6, 7 and 8). The anvil 38 and the press 70 respectively are provided with pressure faces 38a and 70a. The pressure face 70a preferably is constituted by a strip of resilient material such as rubber in order that it may accommodate any irregularities in the valve sleeve and in order to permit a yielding engagement with the sleeve while the spreader fingers are still in the sleeve but are in the process of being withdrawn therefrom. Said yielding engagement thus will not prevent the withdrawal of the fingers. Moreover, the resilient pressure face 70a accommodates the bag tape as at 27b (Fig. 5).

A device is shown in Fig. 5 for flattening the tape 27b just prior to clamping action in order to avoid crumpling same. A crumpling of the tape might interfere with a proper contact between the jaws of the clamp and the bag valve. A pair of tape engaging fingers 70b, 70b are pivotally mounted at 70c adjacent pressure face 70a and are resiliently held in the position shown by means of a spring 70d which urges the fingers against a pin 70e. The extremities of the fingers are bevelled in order to assist in pushing or folding over the tape against the surface of the flattened valve 26.

The anvil 38, in the form shown, is adapted for axial movement within the housing or frame 62 whereby it can be brought from an inactive or primary to an active or secondary position. In the latter position, the anvil is in operative association with a bag valve sleeve which has been theretofore spread by the above mentioned spreader. Thereafter, the anvil is brought into a clamping relationship with the press 70 to press together the valve sleeve surfaces. It is to be understood that the anvil may be brought into its active position by, for example, an angular instead of an axial movement.

The anvil may be mounted for said axial movement upon a plurality of rollers as at 71 and 72 (Fig. 6). Similar rollers may be provided upon the side of the anvil opposite to the side viewed in Fig. 6. The rollers 71 and 72 preferably move within a track formed in a bottom plate 62a of the frame 62. As illustrated in Fig. 4, the track is of such dimensions that the rollers may not shift laterally by an appreciable amount but sufficient freedom is allowed to permit free rolling movement. In order to prevent vertical movement of the anvil, shoulders 62b may be situated above the rollers 71 and 72 (Fig. 4).

Further means for accurately guiding the anvil 38 in its axial movement are provided comprising a center guide roller 73 which may be attached to the anvil by means of a suitable stud 74. The roller 73 moves preferably within a centrally disposed slot 75 formed within the plate 62a. One or more of guide rollers 73 may be employed.

As mentioned above, if desired, heat may be applied to the valve sleeve which is being sealed. Suitable means for this purpose may be associated with either the press 70 or the anvil 38 or heat may be directed to the sleeve by other means. However, in the form shown, an electrical resistance heating element 76 is secured to the anvil preferably directly beneath the pressure face 38a of the anvil 38. Such heating element is connected to a suitable source of electric energy (not shown) by means of leads 77 and 78. A thermo-switch 79 may be interposed in one of the leads 77 or 78, and is effective to maintain a predetermined uniform temperature in the heating element. The thermo-switch may operate upon an expansion principle wherein the circuit is made or broken in accordance with the temperature of the heating element.

The adhesive used should be well adapted to adhere to paper and also to form a bond with itself. It is desirable for the adhesive to be of such a type that it need not be held pressed together for an appreciable period in order to effect a bond. In other words, it is desirable that pressure need be applied for only a short period, such as a few seconds, and thereafter released without detriment to the formation of the bond.

It is, of course, possible to employ a pressure sensitive adhesive which does not require heat for its activation. In such case, the heating element 76 may be dispensed with and only pressure used for sealing.

The reason for mounting the anvil 38 and the carriage 37 for axial movement within the frame 62 is to permit a withdrawal of these two members into said frame in such a manner that they do not interfere or collide with the bag portions when the heat sealing unit is brought into its initial position adjacent the valve sleeve preparatory to sealing same. In Fig. 6 the mouth of the valve sleeve 26 is shown in close proximity to the anvil and the spreader fingers.

It is, of course, desirable to spread the sleeve 26 into a substantially flat condition prior to the moving of the anvil pressure face 38 beneath the valve. Consequently, it is desirable for the spreading apparatus to operate in advance of the positioning of the pressure face 38. The carriage 37 is adapted by virtue of the spring 63 to be shifted axially very rapidly in response to a tripping of the latch 66 which thereby will thrust the spreader fingers into the valve. Shortly thereafter, and prior to the positioning of the pressure face, the valve 26 is spread or flattened in a manner to appear later.

The above described latch 66 comprises a primary carriage latch which is adapted for being tripped in response preferably to a closing movement of the clamp, that is, in response to angular movement of the press 70 toward the anvil 38. This may be accomplished by means of a trip lever 80 (Figs. 3 and 6) which may be secured to a shaft 81 upon which the press 70 pivots. Shaft 81 may be mounted at opposite extremities thereof upon the frame 62. A secondary carriage latch for holding the carriage in an extended position will be described hereinafter.

The manner of operation of the finger expander assembly has been described above to the effect that expansion of the fingers will occur in response to an axial shifting of the rod 49 to the left as viewed in Figs. 3, 6-8, and 16, 17. This axial shifting of the rod 49 preferably is accomplished also in response to a closing movement of the press 70. A bifurcated lever 82 (Figs. 6-8) is provided for this purpose and is adapted for contacting the rollers 52 and 53 (Fig. 16). The bifurcated lever 82 is provided with fingers 82a (Figs. 4, 16, 17) which comprise the bifurcated portion thereof for contacting the rollers 52 and 53. Lever 82 preferably is attached to the hub of the press 70 as shown in Fig. 4. Said lever 82 preferably is adjusted to contact the rollers 52 and 53 of rod 49 for the first time after the rod has shifted axially from the inactive position of Fig. 3 to the active or extended position as shown in Fig. 7. Lever 82 thus will urge the rod 49 and tends to urge the finger carriage 37 to the left as viewed in Fig. 7. In order to prevent the finger carriage from being moved to the left during the spreading of the fingers 33 and 34, it is necessary to provide a secondary carriage latch 83 (Figs. 3 and 16) which is pivotally mounted at 84. Secondary latch 83 is provided with a roller 85 (Figs. 3, 7, 16) which is adapted for falling behind the latch plate 56 (Fig. 7) and preventing a leftward motion of the carriage 37 when the latter is urged in that direction by means of the bifurcated lever 82.

After the fingers 33, 34 have been spread, it is of course necessary to withdraw same. In order to do this, it is necessary to lift the secondary latch 83, thus freeing the carriage 37 for movement to the inactive position thereof. A second roller 86 is provided upon the lever 83 for this purpose and is adapted for cooperation with a secondary latch trip lever 87 (Figs. 3 and 7a). The trip lever 87 preferably is secured to the hub of the lever 70.

The anvil 38 normally is in an inactive position withdrawn into the frame 62 as shown in Fig. 6 when the clamp also is inactive. The active position of the anvil is as shown in Fig. 8. The anvil may be moved from the inactive to the active position by any suitable means, for example, by manually operated means. However, it is desirable to move the anvil automatically in response to, for example, closing movement of the clamp.

In the form shown, the automatic means for moving the anvil 38 comprise a gear train which is operated in response to angular movement of the press 70. A gear 88 (Fig. 6) may be mounted upon the shaft 81 which is in mesh with an intermediate gear 89 which in turn is pivotally mounted upon the frame 62 and which meshes with a rack 90 attached to the anvil 38. Thus, a downward movement of the clamp 70, as viewed in Fig. 6, will communicate a thrust to the anvil which will urge same outwardly toward the extended position thereof.

The above mentioned power means 31 for opening and closing the bag clamp comprises, for example, a pneumatically operated cylinder 91 (Fig. 2) which is pivotally mounted at 92 and connected to the press 70 by means of a piston rod 93 which may be secured thereto by a suitable pin as at 94 (Fig. 6).

A hand-operated valve 95 (Fig. 1) having a handle 96 may be provided for controlling the actuating medium for the power cylinder 91. Suitable conduits 97 and 98 conduct said medium to cylinder 91. A valve identical to valve 95 is employed for the other heat sealing device shown in Fig. 1.

As above described, the heat sealing units 20 and 21 (Fig. 1) are pivotally mounted respectively at 28 and 29. Manually controlled power means may be provided for shifting the heat sealing units into and out of their active positions. Consider, for example, unit 20 which is similar to unit 21 and is held in its inactive position by means of a toggle link arrangement 99 having arms 100 and 101. The former arm is pivotally attached to the heat sealer 20 at 100a and the opposite extremity is pivotally attached to the arm 101 at a knee. The opposite extremity of arm 101 is mounted at 102 to a fixed pivot. It will be seen that when a pivot pin 103 for the knee of the toggle arrangement is in the position shown in the left hand unit of Fig. 1, the heat sealer moves into register with a bag which has been tilted away from the left hand spout. Also, when the pivot 103 is moved above the line connecting the pivots 102 and 100a, a toggle action will occur as indicated in the right hand unit in Fig. 1.

A suitable pneumatic power cylinder 104 may be provided for controlling the toggle link arrangement and this cylinder may be controlled by means of the valve 95. The latter may be of a type which is adapted for controlling a plurality of power cylinders separately. Suitable conduits 105 and 106 convey an actuating medium to the power cylinder 104. A limit stop 107 may be employed for defining the angular limit of motion of unit 20 toward the right.

The operation of the toggle link arrangement and power cylinder 104 first will be described and thereafter the operation of the heat sealer per se.

When it is desired to register, for example, the heat sealing unit 20 with the valve of a bag, the handle 96 may be angularly shifted, for example, counterclockwise through a small angle such as 22½ degrees. This directs fluid such as air to the top of cylinder 104 which breaks the toggle lock causing the sealer 20 to move into the vertical line of the bag and the extended valve sleeve as shown for the left hand unit 20. The sealer unit will stay in this position against limit stop 107. No further action takes place until the valve handle 96 is again moved, for example, counterclockwise an additional small amount such as 22½ degrees. This action causes air to flow to the top of the power cylinder 91 which operates the heat sealer in a manner to appear below. The valve sleeve is expanded and sealed within one or two seconds by means of heat and pressure. The handle 96 thereafter may be shifted, for example 22½ degrees clockwise which causes the air to flow into the bottom of power cylinder 91 which causes the press 70 to raise and to open the bag clamp and to reset the heat sealer for the next sealing operation. A further clockwise motion of the valve 96, for example, an additional 22½ degrees causes air to flow into the bottom of the power cylinder 104 which resets the toggle lock or link 99. The toggle link serves an additional function in that it will hold the heat sealing unit in the "out" position in case the fluid pressure within the cylinder 104 is cut off.

Novel means are provided for moving the valve corners of bags 27, 27a alternatively into and out of a sealable position. Such means for bag 27 only will be described which comprises means for supporting the bag alternatively in a filling position upon the spout 22 and in a position with the bag valve moved away from the spout. Said novel means are generally designated as a bag tilting device 108 and are constituted preferably by a device 108 (Fig. 18) for gripping the upper portion of the bag at, for example, the upper sewn taped portion 27b, and for moving the bag from a position on the spout away therefrom to a sealable position.

Tilting device 108 is designated generally as a tilt clamp or tape clamp and is constituted preferably by a toggle arrangement (Figs. 18, 19) having clamping arms 109, 110 pivoted at 111, and toggle arms 112, 113 pivoted respectively to clamping arms 109, 110.

Toggle arms 112, 113 are pivoted to one another at 114. A toggle spring 115 is attached to clamping arms 109, 110 whereby the latter are urged together at all times. Downward pressure upon the pivot 114 will urge same to a point immediately above pivot 111 and below a line between the respective pivots of arms 109, 112 and 110, 113. Thus a toggle action will occur to retain the tilt clamp 108 in an open position.

The tilt clamp 108 is angularly shiftable preferably by virtue of its association with a tiltable bag chair 116 mounted beneath the bag spout. Chair 116 is pivoted at 117 to a suitable support 118. Pivot 117 is preferably to the right of the center of gravity of the bag chair, as viewed in Fig. 18, whereby gravity normally retains the chair in an untilted or level position. A spring 119 may be provided for yieldingly holding chair 116 in its level or untilted position.

Tilt clamp 108 is mounted upon chair 116 by means of a yoke member 120 which is preferably attached at the base thereof to opposite sides of the chair.

A stationary ledge 121 is provided against which the bag may rest when in a tilted position (Fig. 18). The ledge is desirable to support the tilt clamp 108 and the actuation of the heat sealer 20 in a manner to appear later.

The bag chair 116 (Fig. 20) may be one of a pair (116, 122) and may be tiltable by means of a cam arrangement comprising a cam 123 which, in the form shown, may be stationary and the tub frame may be movable from side to side. Cam 123 is provided with elevated portions or humps (123a, 123b) on the right and left portions thereof respectively, which are adapted for cooperation with chair tilt arms 124 and 125 respectively. The chair tilt arms are engageable respectively with chairs 122 and 116; 122 to tilt same. Cam 123 may be automatically governed by the filling apparatus 25.

The tilt clamp 108 can be opened shortly before the actual clamping of the valve 26. This may be accomplished by an arm 126 (Fig. 18) rigidly attached to jaw 70 of the valve clamp. Arm 126 assumes a position immediately above the pivot 114 when the heat sealing unit is in an active position in register with a valve.

The tilt clamp may be closed by hand or, for example, by a suitable cam 127 which may be controlled, for example, in response to relative motion of cam 123 or the frame upon which it is mounted. The clamp 108, of course, is closed after a bag has been placed on the spout 23 and is prepared for the next filling.

In operation, the sequence of events is as follows:

Bag filled and positioned for sealing (1) Bag 27 is filled through tube 22 and is then tilted away from the tube by means of its chair and bag tilting mechanism above described.

(2) Sealing apparatus 20 is angularly shifted from inactive to active position by actuation of power cylinder 104.

The press 70 at this time is in an open position, and the spreader and anvil 38 are in their primary or withdrawn positions.

Insertion of spreader fingers into valve (1) Hand valve 95 is moved to admit actuating fluid into the upper part of cylinder 91 and the press 70 commences its closing movement toward the anvil.

(2) The initial closing movement of the press 70 trips primary latch 66 by means of latch trip lever 80 which strikes catch 68.

(3) Spreader finger carriage 37 immediately moves from its primary position (Fig. 6) to its secondary position shown in solid lines in Fig. 8 under the influence of spring 63.

(4) The spreader fingers 33 and 34 are still contracted at this time and they are thrust into the valve 26 as in Fig. 9.

(5) Secondary latch 83 (Figs. 7 and 16) now falls into position locking the spreader carriage 37 in its extended or secondary position, thus preventing the carriage from moving to the left during the expansion of the fingers 33, 34 as caused by a leftward thrust from the bifurcated lever 82.

(6) Anvil 38 moves progressively from its primary position toward its secondary position in response to closing movement of the clamp. This occurs by means of gear 88, pinion 89 and rack 90.

Spreading of fingers in valve (1) Lever 82 now contacts rollers 52, 53 of rod 49 by means of fingers 82a and urges same to the left away from the valve (Fig. 7).

(2) The resilient wedge or expander assembly 40, 41, 42 mounted upon rod 49 is thus urged to the left. By means of said resilient wedge member an outward or spreading thrust is applied to fingers 33, 34 whereby they are spread as shown in Figs. 10 and 16 against the influence of contracting spring 39. Because of the resilient thrust exerted upon the fingers by means of springs 45, 46 and the wedge arms 41, 42, the spreader fingers are adapted to accommodate valve portions of differing sizes.

(3) Fingers 33, 34 are locked in an expanded condition by virtue of the expander rod latch 54 (Fig. 16) which locks rod 49 in the left hand extended position thereof. The latch roller 54a falls behind latch plate 56 under the influence of spring 54b (Fig. 3), thus accomplishing the locking.

Withdrawal of fingers from bag valve sleeve (1) Secondary latch 83 is now lifted by secondary latch trip lever 87 (Figs. 7a and 8) contacting roller 86 and thus lifting roller 85 of said latch 83 from a latching position relative to latch plate 56.

(2) Thereafter, the thrust to the left exerted on the rod 49 is effective to entrain carriage 37 through the intermediary of the expander block assembly 40, 41, 42. The withdrawal of the fingers 33, 34 from valve sleeve 26 commences substantially immediately after the lifting of secondary latch 83 and preferably is not quite complete when press 70 first presses valve sleeve 26 against anvil 38. That is, it is desirable for fingers 33, 34 to be slightly pinched between the press and anvil before complete withdrawal. Thus the danger of crumpling the valve sleeve is avoided.

Clamping of bag (1) Tape flattening fingers 70b, 70b engage the tape 27b as shown in Fig. 5 and thrust same to a flattened position on the valve sleeve, thereby avoiding a crumpling thereof and consequent defective sealing of the valve.

(2) Thereafter, the resilient pressure face 70a contacts the valve sleeve 26 when at least the tips of the fingers 33, 34 are still within the sleeve.

(3) The anvil 38 at this point is fully extended (Fig. 8) relative to the housing therefor and is in position to give full support to the valve sleeve.

(4) The press and anvil, i. e., the clamp, apply heat and pressure to the sleeve, for example, heat at 300° F. and pressure at 50 p. s. i. for a period, for example, of two seconds.

(5) The fingers 33, 34 are fully withdrawn prior to the application of full pressure to the sleeve.

(6) Lever 82 has progressively urged rod 49 and fingers 33, 34 to the left and shortly after withdrawal of the fingers from the sleeve the arm 57 of expander rod latch 54 contacts trip block 58 and the fingers 33, 34 are contracted under the influence of contractor spring 39. Rod 49 now assumes the position shown in Fig. 6.

(7) During the latter part of the inward movement of the carriage 37 the primary latch 66 falls over latch plate 56 and retains same in a cocked position against the pressure of spring 63.

Opening of clamp (1) Handle 96 of valve 95 may now be turned and actuating fluid directed to the lower chamber of cylinder 91 whereupon the press 70 and anvil 38 move back to the position shown in Fig. 6. During the upward movement of press 70, the trip lever 80 contacts catch 68 which resiliently moves out of the way and snaps back into normal position after the passing of said trip lever.

While the invention has been described with respect to certain preferred examples which have given satisfactory results, it will be understood by those skilled in the art after understanding the invention that various changes and modifications may be made without departing from the spirit and scope of the invention, and it is intended, therefore, in the appended claims, to cover all such changes and modifications.

What is claimed as new and is desired to be secured by Letters Patent is:

1. In apparatus for sealing a valve of a bag, the combination comprising an anvil shiftable from an inactive to an operative position adjacent a bag valve, means for heating said anvil, a pair of spreader fingers, a mounting for said fingers shiftable from a primary to a secondary position, a press adapted to cooperate with said anvil in a clamping relation therewith, power means for actuating said press, means for connecting said anvil for movement to and from said positions in response to movement of said press, means for urging said fingers into a valve portion of a bag when said fingers are unexpanded, means for expanding said fingers in the valve portion in response to movement of said press, means for timing the press movement whereby the valve is engaged between the press and said anvil at a region which is internally spread directly by said fingers; and means for withdrawing said fingers from the valve portion in response to motion of said press toward said anvil after said press and anvil have engaged the valve portion and prior to application of full clamping pressure thereto.

2. In apparatus for sealing a valve bag the valve structure of which is provided on the internal wall areas thereof with adhesive for sealing same in response to clamping the wall areas together, the bag end having a closure tape extending along a portion of the valve, the combination of valve spreader mechanism for first spreading such wall areas to a substantially flat condition, with the tape in a generally upstanding position, a clamp for pressing said wall areas together, a finger pivotally mounted on said clamp for engaging said tape in advance of the clamping of the valve, said finger being adapted for flattening the tape against the adjacent wall area, a resilient member mounted on said clamp for engaging the valve in clamping relationship when pressed by said clamp against the valve, said resilient member being adapted for accommodating the closure tape and any irregular wall portions of the valve, and means for disengaging said spreader mechanism from the valve.

3. In apparatus for sealing a valve of a bag, spreader means insertable in a portion of the bag valve for spreading and flattening same, a valve clamp for clamping and sealing the valve portions so spread and flattened, and mechanism responsive to clamping movement of the valve clamp for withdrawing said spreader means after said clamp engages the valve but prior to the application of full clamping pressure to the valve portions.

4. In apparatus for sealing a valve of a bag, an anvil, means for moving said anvil from an initial position into a supporting position adjacent said valve, spreading means for said valve, means for urging said spreading means into engagement with portions of said valve to spread same prior to the movement of said anvil adjacent the valve, means for heating said anvil, a press adapted for urging said valve portions against said anvil, a resilient pad on said press for accommodating irregular portions of the valve, and means for withdrawing said spreading means from the valve portions in response to clamping movement of the press toward the anvil.

5. In apparatus for sealing a valve of a bag, the combination comprising a spreader for engaging internal surface portions of the valve and spreading same to a generally flat condition, means for yieldably expanding said spreader for accommodating various sizes of bag valves, an anvil positioned near said spreader and mounted upon said apparatus for sliding motion relative to and in the same direction with said spreader to a position wherein the spread portions of the valve are interposed between said anvil and said spreader, means for actuating the anvil and the spreader, a press for cooperating in a clamping relationship with said anvil and for engaging and pressing together the valve portions so spread into the generally flat conditions, means for disengaging said spreader from said valve portions in response to motion of said press toward said anvil, power means drivably connected to said press for moving same, manually operable control means for governing said power means, a mounting for said anvil, spreader, press and power means, and power means for shifting said mounting toward and away from the bag valve.

6. Method for sealing a valve bag having a tuck-in valve sleeve which protrudes from the bag in a flattened condition substantially in the plane of the bag when the latter is empty, which method comprises, filling the bag in response to which the sleeve is spread and somewhat flattened in a second plane which is substantially perpendicular to said plane of the bag; applying to the sleeve from within same a spreading pressure acting radially of the sleeve and in the second plane whereby the flattening of the sleeve is completed in the second plane; and applying heat and pressure externally of the sleeve during a portion of the period that said internal spreading pressure is acting, said heat and pressure being applied to the portions of the sleeve flattened by said spreading pressure to seal same in said second plane.

7. In apparatus of the class described, the combination comprising: a valve bag filling machine having a filling spout and a bag saddle for supporting a bag in filling relation to the spout wherein the spout is inserted into the bag valve, the latter bearing heat activatable adhesive on opposed wall portions thereof which portions are adapted to be brought together and adhered to seal the valve; a bag clamp adapted for grasping said bag, said clamp being angularly movable away from said spout whereby the bag valve of the bag grasped thereby is withdrawable from the filling spout and held in up-tilted spaced relation thereto; spreader means insertable into the bag valve for spreading and flattening same; a valve clamp for pressing together the portions of said valve flattened by said spreader means; a heater element upon said clamp for applying heat to said valve; and mechanism responsive to clamp closing movement of said clamp for withdrawing said spreader means after said clamp engages a spread portion of the valve and before the application of full clamping pressure to the valve.

8. In apparatus for sealing a valve of a valve bag, the combination comprising: a filling machine having a filling spout for insertion into the bag valve; a spreader for engaging the internal surfaces of the valve and spreading same to a generally flattened condition after such valve has been disengaged from said spout, said spreader being yieldably expansible for accommodating various sizes of bag valves; an anvil positioned near said spreader and mounted on said apparatus for linear sliding motion toward a disengaged bag valve to an operative position relative to the spread valve; a press for cooperating in clamping relationship with said anvil; mechanism responsive to clamp closing movement of said press for first actuating said spreader and thereafter urging said anvil by said linear sliding motion to said operative position relative to the spread valve portion; and mechanism responsive to press closing movement of said press for withdrawing said spreader after said press engages the valve.

9. In apparatus for sealing a valve of a valve bag, the valve having heat activatable adhesive on the inner wall surfaces thereof, a carriage member; spreader fingers mounted upon said carriage member, the latter being mounted for sliding axial movement substantially in the direction of the longitudinal axis of the valve of the bag; mechanism for holding said carriage member in an inactive position; means for urging said carriage member against said holding mechanism and toward an operative position adjacent a bag valve; an anvil member adapted for linear sliding movement parallel to that of said carriage member; a press adapted to cooperate in a clamping relationship with said anvil; a heater element for applying heat to the bag valve clamped by said press and anvil; mechanism responsive to press closing movement for releasing said carriage member holding mechanism whereby said spreader finger and carriage member are urged toward the bag valve and the spreader fingers are pressed therein while in a contracted condition; mechanism also responsive to press closing movement for spreading said spreader fingers after the latter have been inserted into the bag valve; mechanism operatively connected to said press for urging said anvil into an operative position relative to the spread valve portions, the movement of said anvil to the operative position occurring after said fingers have been spread and the valve portions have been flattened; and mechanism responsive to press closing movement for withdrawing said spreader fingers from the spread bag valve after said press engages the spread portions of the valve and urges same toward said anvil.

10. In apparatus for sealing a valve of a valve bag having a taped end, the valve having heat activatable adhesive on the inner wall surfaces thereof, spreader means insertable into a portion of the bag valve for spreading and flattening same; a valve clamp including a resilient pad for pressing together the portions of said valve flattened by said spreader means; said resilient pad adapted for accommodating said tape and any irregularities in the valve surfaces whereby the clamp presses positively together opposed flattened wall areas of the valve; means for applying heat to said clamp, the combined action of said clamp, pad, and heat being effective to seal the valve; and mechanism responsive to clamp closing movement of said clamp for withdrawing said spreader means after said clamp engages the spread portion of the valve but before the application of full clamping pressure to the valve.

11. In apparatus for sealing a valve of a bag, spreader means insertable into a portion of the bag valve for spreading and flattening same; a valve clamp; a resilient pad mounted on said clamp; means for applying heat to said clamp, said heated clamp with said resilient pad being adapted for clamping and sealing the flattened portion of the valve; and mechanism responsive to clamp closing movement of said clamp for withdrawing said spreader means after said clamp engages the valve but prior to the application of full clamping pressure to the valve portions.

12. In apparatus for sealing the valve of a container wherein opposed valve wall portions are provided with heat sensitive adhesive for sealing same, a pair of spreader fingers, a carriage for said fingers, means for mounting said carriage for axial movement between a primary position removed from the valve, and a secondary position adjacent the valve, resilient means for urging said fingers towards a contracted condition, a wedge member having resilient sides interposed between said fingers and adapted for movement relative thereto whereby said fingers are spread or contracted, resilient means for urging said carriage toward the secondary position thereof, a primary latch for retaining said carriage in the primary position thereof, a secondary latch for retaining said carriage in the secondary position thereof, a clamp comprising an anvil and a press, means for mounting said anvil for axial movement between an inactive position removed from a valve to an active position wherein the valve is interposed between the press and anvil, mechanism for interconnecting the anvil for axial movement in response to movement of said press, said anvil being movable from the inactive to active position thereof in response to closing movement of said press, means for tripping said primary latch in response to initial closing movement of said press, said secondary latch thereafter becoming effective to retain said press in its secondary position, means for moving said wedge member to spread said fingers in response to further closing movement of said press, means for tripping said secondary latch thereafter in response to further closing movement of said press, the movement of said wedge after the tripping of said secondary latch entraining said carriage through the intermediary of said fingers, and shifting same axially toward the primary position thereof whereby said fingers are withdrawn from the valve, and means for heating said clamp, the latter being adapted for clamping the spread portions of said valve prior to complete withdrawal of said fingers.

13. In apparatus for sealing a valve of a container wherein opposed valve wall portions are provided with adhesive for sealing same, a spreader carriage, means for mounting said carriage for movement from a primary position to a secondary position, the former being an inactive position removed from the bag valve and the latter being an active position adjacent the bag valve, a valve spreader mounted upon said carriage for spreading the bag valve substantially to a flat condition, resilient means for urging said carriage toward the secondary position thereof, a latch for retaining said carriage in the primary position thereof, an anvil having a surface against which the valve is pressed, means for mounting said anvil for movement from an inactive position removed from the valve to an active position adjacent the valve, a clamp for pressing the valve upon said anvil, means for tripping said latch in response to closing movement of said clamp, means for interconnecting said anvil for movement in coordination with the movement of said clamp, the anvil being movable from an inactive position when the clamp is open relative to the anvil to an active position in response to closing movement of said clamp relative to the anvil, means for spreading said valve spreader in response to closing movement of said clamp, and means for moving said carriage to the primary position thereof in response to further closing movement of said clamp, said fingers mounted on the carriage being thus withdrawn from the valve.

14. In apparatus for sealing the valves of containers wherein opposed valve wall portions are provided with heat sensitive adhesive for sealing same, a finger carriage adapted for axial movement, a pair of fingers upon said carriage adapted for insertion within a valve and for spreading same to a substantially flat condition, an anvil axially movable from an inactive position to an active position adjacent a valve, a press member for pressing a valve upon said anvil, resilient means for urging said carriage toward one extremity of the range of axial movement thereof, a latch for holding said carriage adjacent the opposite extremity of said range, mechanism for operatively interconnecting said anvil and press whereby the anvil moves to said active position in response to a closing movement of the press, mechanism for tripping said latch in response to closing movement of said press, mechanism for expanding said fingers in response to closing movement of said press, said last-mentioned mechanism being adapted for simultaneously withdrawing the fingers from the valve after said press has engaged the spread valve, and means for applying heat to said valve during the clamping thereof.

15. In apparatus for sealing a valve bag, the valve structure of which is provided on the internal wall areas thereof with adhesive for sealing the valve in response to the clamping together of such wall areas, said valve bag having a tape comprising a portion of said valve, the combination of a spreader mechanism for spreading such wall areas of the valve to a substantially flat condition, said tape assuming a generally upstanding position relative to the flattened wall areas as a result of the spreading of said wall areas, a clamp having a resilient pad mounted upon at least one of the faces thereof for pressing together said wall areas, a tape flattening member mounted on said clamp for engaging said tape in advance of clamping of the valve and flattening the tape into parallel relation to the wall areas to be sealed whereby crumpling of the tape is avoided, power means for actuating said clamping means, and means for disengaging said spreader mechanism from the valve in response to closing movement of said clamp.

16. In apparatus for sealing a valve of a valve type bag having opposed wall surfaces carrying adhesive for sealing same, spreader means insertable in a portion of the bag valve for engaging and spreading such portion, a valve clamp for clamping and sealing the valve portion so engaged and spread, and mechanism operatively connected with said spreader means and operative in timed relationship with said clamp for withdrawing said spreader means after said clamp engages such valve portion but prior to the application of full clamping pressure to such valve portion so engaged and spread.

17. In apparatus for sealing a valve of a valve type bag having opposed wall surfaces carrying adhesive for sealing same, a spreader element mounted for insertion in such a valve for directly engaging and spreading a portion thereof, a valve clamp for clamping and sealing such valve portion so directly engaged and spread, and control mechanism operatively connected with said spreader element for controlling the inserting of the latter into such valve and the withdrawing of same, said control mechanism being operative in timed relationship with the motion of said clamp for withdrawing said spreader element after said clamp has engaged such valve portion so directly engaged and spread.

18. In apparatus for sealing a valve of a bag, such valve having opposed wall surfaces carrying heat activatable adhesive for sealing same, a spreader device insertable in such a valve for directly engaging, spreading and flattening a portion thereof; a valve clamp for clamping and sealing such valve portion, said clamp including a heating element; and control mechanism operatively connected with said device for controlling the insertion thereof into and the withdrawal thereof from such valve, said clamp and control mechanism being operatively interconnected whereby said spreader device and clamp are operative in timed relationship and said device is withdrawn from the valve after said clamp has engaged such directly spread valve portion.

19. In apparatus for filling valve bags and sealing the valves thereof, such valves being of a type bearing heat sensitive adhesive on opposed wall portions which are adapted to be brought together and adhered to seal the valve, the combination comprising: a valve bag filling spout, means adjacent and connected to said spout for urging material therethrough, bag chair means pivotally associated with said apparatus and normally positioned for holding a bag in filling relation with said spout, the latter then being in the valve of such bag, said chair means being angularly shiftable to another position for supporting a bag with such valve tilted away from said spout, the longitudinal axis of the bag valve being angularly removed from the horizontal in such latter position, and heated clamping means movably mounted on said apparatus adjacent said spout and movable, relative to a bag on said chair means, from an inactive to an active position to clamp together such wall portions of the valve after said bag chair means has been shifted angularly to said other position and a bag thereon is so tilted away from said spout.

WILLIAM R. PETERSON.
CARL H. HARTMAN.

REFERENCES CITED

The following references are of record in the file of this patent:

UNITED STATES PATENTS

| Number | Name | Date |
| --- | --- | --- |
| 2,114,624 | Bergstein | Apr. 19, 1938 |
| 2,166,761 | Kohl | July 18, 1939 |
| 2,295,335 | Cloud | Sept. 8, 1942 |
| 2,317,865 | Talbot | Apr. 27, 1943 |